Figure 1:
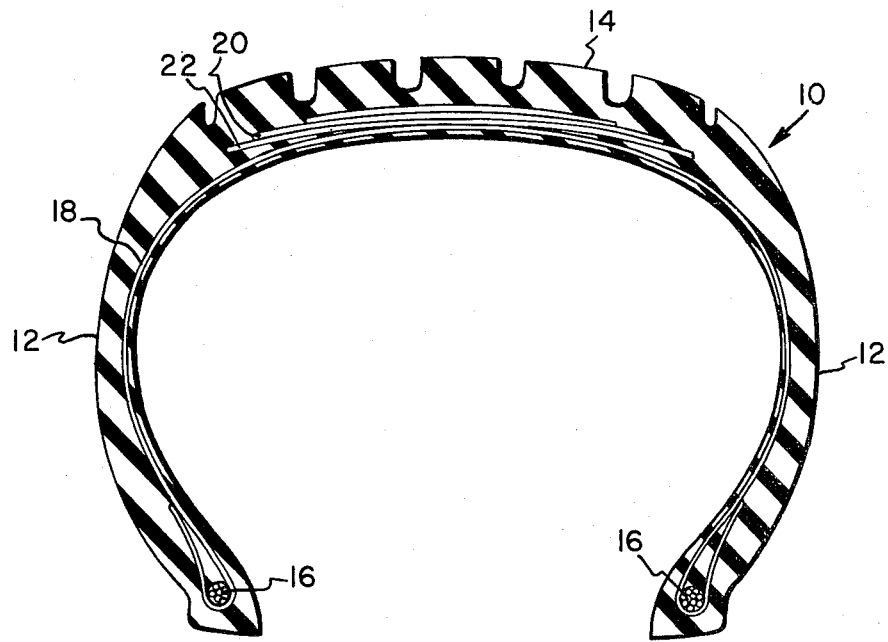

United States Patent [19]

Pepe

[11] 4,363,346

[45] Dec. 14, 1982

[54] PNEUMATIC TIRE INCLUDING GAS ABSORBING CORDS

[75] Inventor: Richard J. Pepe, Hartville, Ohio

[73] Assignee: The Goodyear Tire & Rubber Company, Akron, Ohio

[21] Appl. No.: 304,729

[22] Filed: Sep. 23, 1981

[51] Int. Cl.³ .................. B60C 9/04; B29H 17/28; B32B 25/02

[52] U.S. Cl. .................. 152/356 R; 152/359; 152/361 DM; 152/354 R; 156/110 C; 156/123; 428/232; 428/259; 428/295; 428/390; 428/393; 428/395; 57/902; 139/426 R

[58] Field of Search ......... 156/110 R, 110 C, 123 R, 156/124; 152/330 R, 354 R, 354 RB, 355, 356 R, 357 R, 358–359, 361 DM, 362 CS; 139/425 R, 425 A, 426 R, 426 TW; 428/232, 258–259, 295, 292, 294, 390, 392–395; 57/902

[56] References Cited

U.S. PATENT DOCUMENTS

| | | |
|---|---|---|
| 1,875,517 | 9/1932 | Steere .................. 152/361 R |
| 2,541,506 | 2/1951 | Cuthbertson et al. .......... 152/357 R |
| 2,770,282 | 11/1956 | Herzegh .................. 152/330 R |
| 3,552,468 | 1/1971 | Gallagher .................. 152/359 |

*Primary Examiner*—Edward C. Kimlin
*Assistant Examiner*—Lois E. Boland
*Attorney, Agent, or Firm*—M. W. Goodwin

[57] ABSTRACT

Pneumatic tires are rendered less susceptible to blow or blister defects by providing, in at least one cord reinforcement ply of a tire, a plurality of gas absorbing cords less in number than the reinforcement cords with the reinforcement cords and gas absorbing cords lying in the same general plane and with the gas absorbing cords consisting of staple filaments selected from the group consisting of nylon, rayon, polyester or glass.

The foregoing abstract is not to be taken as limiting the invention of this application, and in order to understand the full nature and extent of the technical disclosure of this application, reference must be made to the accompanying drawing and the following detailed description.

10 Claims, 3 Drawing Figures

PNEUMATIC TIRE INCLUDING GAS ABSORBING CORDS

This invention relates to pneumatic tires and more particularly to a novel and improved tire cord fabric and the use thereof in a pneumatic tire to reduce defects in tires known as blows.

In the curing of a pneumatic tire the presence of air or other compressible gases within the body of the tire being cured may cause defects which are known as blows or blisters. These defects may involve local separation between the rubber and one or more of the reinforcement cords which make up the reinforcing ply of a pneumatic tire. Air may become trapped in or between the layers of materials which are superimposed in the course of building the tire or may in some instances enter into the tire during the time lapse between the building of the tire and the placing of the tire into a mold in which it will be cured. Occasionally small quantities of air may be forced into the body of the tire by the closing of the mold.

It has been known in the art that tire reinforcement cords contain passages extending generally throughout the length of the cord and lying between and bounded by the filaments of which the cords are made and that air or other gases can travel along such passages. In has been observed that the treatment of tire reinforcement cords of the continuous synthetic resin filament materials such as polyester and nylon tend to reduce the cross sectional area of the interfilamentary passages significantly. Treatments which have this effect are generally characterized by the stretching of heated cords which may result in a reduction of a cross sectional area of the individual filaments and a compacting of the filaments more closely to one another.

During the time that the tire is being vulcanized by the application of heat and pressure thereto, any air trapped within the tire or any gases generated during the vulcanization of the tire may be sufficient in volume to prevent the development of a satisfactory bond between the rubber material and the reinforcing cords within the tire or may break such bonds by forcing a separation between the rubber and the reinforcement cords. The resulting defects are known as blisters or blows. Examples of attempts to minimize such blisters or blows are described in U.S. Pat. Nos. 2,541,506 and 3,552,468.

In accordance with one aspect of the present invention, a pneumatic tire is provided with at least one reinforcement ply wherein the reinforcement ply includes a plurality of reinforcing cords embedded in rubber or rubber-like material, the reinforcing cords extending in parallel spaced apart relation. The reinforcing ply further includes a plurality of gas absorbing cords extending parallel to and disposed between the reinforcing cords in spaced relation thereto with each gas absorbing cord lying generally in the same plane as that defined by the reinforcing cords on opposite sides thereof. Each gas absorbing cord consists of a multiplicity of staple filaments of a material or materials selected from the group consisting of nylon, rayon, polyester or glass and being of a diameter no greater than one-third the diameter of one of the reinforcing cords and having a break strength no greater than about 10 percent of the break strength of the reinforcing cords. Each gas absorbing cord is completely surrounded by rubber or rubber-like material forming the ply, and the gas absorbing cords are located alongside only every third to sixth reinforcing cord.

Figure 2:
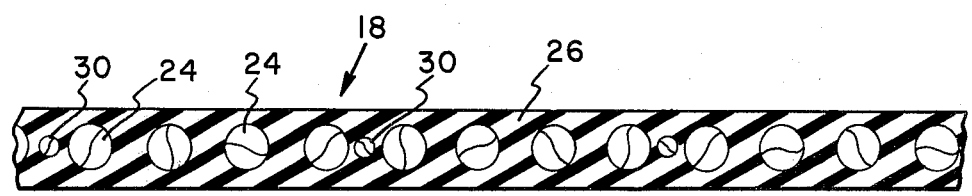
Figure 3:
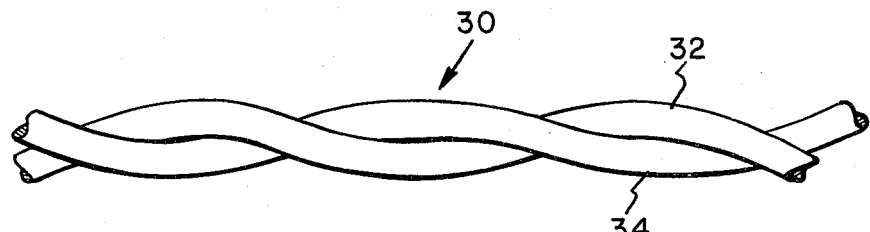

The invention will be described herein in terms of certain preferred embodiments, it being understood though that the scope of the invention is set forth in the claims appended thereto. Other features and advantages of the present invention will become apparent, or will be particularly pointed out hereinafter with reference to the accompanying drawing in which, FIG. 1 is a cross-sectional view of a pneumatic tire incorporating and made in accordance with the present invention, with the view taken in a plane extending radially of and containing the rotational axis of the tire, FIG. 2 is a fragmentary cross-sectional view of a tire reinforcement ply used in the manufacture of the tire of FIG. 1, and FIG. 3 is an enlarged fragmentary plan view of a gas absorbing cord of the ply of FIG. 2.

With reference to FIG. 1, there is shown a pneumatic tire, generally indicated at 10, which comprises a pair of sidewall portions 12 terminating at their radially outer ends in a tread portion 14 and at their radially inner ends in a pair of beads 16. When the term "radially" is used or in the appended claims, it shall be understood that it means "in a direction radially of the tire rotational axis" and where the term "axially" is used herein or in the appended claims, it shall be understood that the term "axially" means in the direction of the rotational axis of the tire. The tire further comprises at least one reinforcement ply 18 connected to each of the beads 16 and extending through the sidewalls of the tire and under the tread portion 14. The tire may have one or more of such reinforcement plies which are generally referred to as carcass plies. The tire 10 may further include additional reinforcing plies in the form of one or more breaker or belt plies 20, 22 disposed in the crown region of the tire between the carcass ply 18 and the tread 14.

The tire 10 may be what is commonly referred to as bias, bias belted, or radial ply construction. In each case the reinforcing ply 18 is composed of a plurality of reinforcing cords extending in parallel spaced apart relation. In the cae of a bias tire construction, these reinforcing cords extend at a suitable angle to the mid-circumferential center plane of the tire at the circumferential centerline of the carcass ply 18, which angle may be, for example, from 25 to 40 degrees. The same would be true if the tire were of a bias belted construction. In a radial ply construction, the cords of the carcass ply 18 will extend substantially radially of the tire, for example, at an angle from 80 to 90 degrees to the mid-circumferential center plane of the tire.

The breaker or belt plies such as 20 and 22 shown in FIG. 1 each also include a plurality of reinforcing cords extending in parallel spaced apart relation. The cords will extend at a relatively low angle, for example, 15 to 25 degrees when the belt plies 20, 22 are used in combination with a radial ply carcass and at a somewhat higher angle, perhaps 25 to 35 degrees when used in conjunction with a bias ply carcass either as a belt or as breaker plies. Where the breaker or belt plies 20, 22 are used in conjunction with a bias belted tire, the cords will have an angle at the mid-circumferential centerline of the tire which is normally at least 5 degrees less than the corresponding angle of the carcass ply or plies, and where used as a breaker in conjunction with a bias tire will have an angle at the mid-circumferential centerline of the tire which is equal or approximately equal to the corresponding angle of the carcass plies.

With reference to FIG. 2, there is shown a carcass ply 18 prior to the assembly of the ply into a tire such as shown in FIG. 1. The ply 18 comprises a plurality of reinforcing cords 24 disposed in parallel spaced apart relation and embedded in a matrix of rubber or rubber-like material 26, preferably by a conventional calendering process wherein the fabric is passed between rolls which press rubber between the cords 24 and coat the array of cords on both sides thereof with rubber. In accordance with the invention, the ply 18 also includes a plurality of gas absorbing cords 30 with each gas absorbing cord 30 extending parallel to and being disposed between a pair of reinforcing cords 24 in spaced relation thereto. As will be seen from FIG. 2, each gas absorbing cord lies generally in the same plane as that defined by the reinforcing cords on opposite sides thereof so as also to be embedded in rubber or rubber-like material. It should also be noted, as is apparent from FIG. 1, that the ends of each of the reinforcement and gas absorbing cords are embedded in rubber and are not in communication with the exterior of the tire.

The reinforcing cords 24 may be of any material or construction suitable for the reinforcement of a pneumatic tire and the term "cord" is used herein, and in the appended claims, to indicate any strength member suitable for the reinforcement of a pneumatic tire. However, the invention has particular utility where the reinforcing cords are formed of a single yarn or multiple yarns twisted together and wherein each yarn is composed of continuous filaments of a thermoplastic material such as nylon or polyester of a type suitable for the reinforcement of a pneumatic tire.

As can be seen from FIG. 2, each of the gas absorbing cords 30 is entirely surrounded by rubber. Each gas absorbing cord 30 consists of a single yarn or as shown in FIG. 3, a plurality of yarns, such as at 32 and 34, twisted together. The yarn or yarns of each cord 30 is composed of staple fibers of material selected from the group consisting of rayon, nylon, polyester or glass with the staple fibers having a length of between one-half inch and two inches. The terms "rayon," "nylon," "polyester," or "glass" as used herein and in the appended claims are intended to cover any such material commonly referred to by such terms and suitable for the use in a pneumatic tire such as those that are commonly known and used presently in the reinforcement of pneumatic tires.

In accordance with this invention, one gas absorbing cord 30 is provided and located alongside only every third to sixth reinforcing cord. In other words, the gas absorbing cords are spaced apart at equal distances laterally across the ply 18 and the distance between each next adjacent pair of gas absorbing cords is equal to the distance between either three, four, five or six reinforcing cords. Thus, there will be one gas absorbing cord alongside only every third, fourth, fifth or sixth reinforcement cord 24 so that the gas absorbing cords will number from one-third to one-sixth the reinforcing cords in the ply. The gas absorbing cords 30 are not intended to contribute to the reinforcement of the tire and thus are not reinforcing cords. In this connection, each gas absorbing cord has a break strength of between about one pound (0.45 Kg) and one and one-half pounds (0.68 Kg) and which will be no greater than about one-fifth of the breaking strength of a reinforcing cord 24. A break strength of about one pound (0.45 Kg) is necessary to assure that the gas absorbing cords will not break under the usual tensions to which they will be subjected during manufacture of the reinforcing ply.

As indicated above, the material of the gas absorbing cords 30 is selected from the group consisting of rayon, nylon, polyester or glass. More particularly, the gas absorbing cord 30 may be made of a single one of these materials or a combination thereof. For example, in the cord 30 of FIG. 3, the yarn 32 is made of polyester staple filaments and the yarn 34 is made of rayon staple filaments. While thermoplastic materials such as nylon or polyester when used in filamentary form in a tire cord will during a hot stretching operation tend to reduce the number of interfilamentary voids in the cord, the fact that the gas absorbing cord 30 is composed of staple filaments assures that the interfilamentary spaces will remain in sufficient number to create the void spaces necessary for the accommodation of gases and air which is desired. Additionally, the staple fibers assure that the cord 30 will have a sufficient elongation that even though a force is applied to the reinforcing cords 24 in excess of the break strength of the gas absorbing cord 30, the cords 30 may not break due to their higher elongation at break than that of the reinforcing cords 24.

As indicated earlier, each gas absorbing cord is completely surrounded by the rubber 26 of the ply 18 so that the entire periphery and surface area of the cord is open to receive gases or air from the surrounding rubber. In this connection, the diameter or gauge of each gas absorbing cord 30 is substantially less than the distance between each pair of next adjacent reinforcing cords 24 and preferably has a diameter equal to no greater than about one third the distance between each next adjacent pair of reinforcing cords 24.

A specific example of a reinforcing ply 18 which has provided a significant reduction in the number of blows or blisters in a tire in which it has been used is one wherein the ply 18 comprised reinforcing cords 24 which were each a single yarn of 1300 denier having a twist of about 10 per inch (4 per cm.). The reinforcing cords 24 were equally spaced apart with 33 cords per inch (13 per cm.). Each reinforcing cord had a gauge or diameter of approximately 0.016 inches (0.4 mm) and the reinforcing cords were spaced apart or had a rivet of about 0.014 inches (0.35 mm). The gas absorbing cords 30 each were composed of a yarn of polyester and a yarn of rayon each having a twist of about 7 turns per inch (2.8 per cm.) twisted together at about 7 turns per inch (2.8 cm.) to provide a cord of size 19 by the cotton count system (about 280 denier). Each gas absorbing cord had a gauge or diameter of about 0.004 inches (0.1 mm) and was located approximately midway between each pair of next adjacent reinforcing cords 24 so as to provide a space of about 0.006 inches (0.15 mm) between each gas absorbing cord and the next adjacent reinforcing cord. One gas absorbing cord 30 was located every fourth reinforcing cord 24. Each of the reinforcing cords 24 had a break strength of about 19 pounds (8.6 Kg) while the gas absorbing cords 30 had a break strength of approximately one and one-quarter pounds (0.6 Kg). The ply had a gauge or thickness of about 0.031 inches (0.8 mm) so that there was about 0.0075 inches (0.2 mm) of rubber or rubber-like material on each side of the array of reinforcing cords.

In the manufacture of a reinforcement ply as described herein, a plurality of reinforcing cords are located in a common plane in parallel spaced apart relation with a gas absorbing cord as defined herein located alongside only every third to sixth reinforcing cord and with each the gas absorbing cords being in parallel, spaced relation to and lying in the same general plane as that of the two reinforcing cords on opposite sides thereof. The array of reinforcing cords and gas absorbing cords is then passed through a conventional calender to embed and completely surround each of the reinforcing and gas absorbing cords in rubber or rubber-like material to form the reinforcement ply. The reinforcement and gas absorbing cords may be held in the desired spaced relationship prior to the calendering operation by any suitable means, such as conventional pick or weft threads extending at right angles to the reinforcing and gas absorbing cords. Alternatively, the "fabric," as the array of reinforcing and absorbing cords is commonly referred to, may be of the weftless type.

The gas absorbing cords of the present invention eliminate any special twist operation for the reinforcing cords as is required in the aforementioned U.S. Pat. No. 3,552,468. Also, the elimination of the cotton yarn in the cord of the aforementioned patent eliminates a bothersome environmental problem caused by an excess of cotton fibers in the air occurring during the twisting of the cotton yarn with the reinforcing cord yarns in a cord of the type described in the aforementioned patent.

While this invention has been described above in connection with pneumatic tires which are cord reinforced elastomeric articles, it will be apparent that it is also useful in other cord reinforced elastomeric articles such as, but not limited to, airsprings.

While certain representative embodiments and details have been shown for the purpose of illustrating the invention, it will be apparent to those skilled in this art that various changes and modifications may be made therein without departing from the spirit or scope of the invention.

Having thus described my invention, I claim:

1. An elastomeric article comprising at least one reinforcement ply wherein said reinforcement ply includes a plurality of reinforcing cords embedded in rubber or rubber-like material, said reinforcing cords extending in parallel spaced apart relation; the improvement wherein said reinforcing ply further includes a plurality of gas absorbing cords, each gas absorbing cord extending parallel to and being disposed between a pair of reinforcing cords in spaced relation thereto, each gas absorbing cord lying generally in the same plane as that defined by the reinforcing cords on opposite sides thereof, each gas absorbing cord consisting of a multiplicity of staple filaments of a material or materials selected from the group consisting of nylon, rayon, polyester or glass and being of a diameter no greater than one-third the diameter of one of said reinforcing cords and having a break strength no greater than about 10 percent the break strength of one of said reinforcing cords, each gas absorbing cord being completely surrounded by rubber or rubber-like material, said gas absorbing cords being located alongside only every third to sixth reinforcing cord.

2. An elastomeric article as described in claim 1 wherein prior to manufacture thereof, said reinforcement ply is a calendered ply containing said reinforcement cords and gas absorbing cords.

3. An elastomeric article as described in claim 2 in which each gas absorbing cord is composed of a single material, the staple filaments of each said gas absorbing cord having a length of between one-half and two inches.

4. An elastomeric article as described in claim 2 wherein each gas absorbing cord has a break strength between one and one and a half pounds.

5. A pneumatic tire as described in claim 2 in which each reinforcing cord consists of continuous filaments of a thermoplastic material.

6. An elastomeric article as described in any one of claims 1 through 5 in which the staple filaments of said gas absorbing cords are between one-half and two inches in length.

7. An elastomeric article as described in any one of claims 1 through 5 in which each gas absorbing cord comprises two yarns of different material twisted together to form a cord, the staple filaments of each gas absorbing cord having a length of between one-half to two inches.

8. A method of manufacturing an elastomeric article containing at least one reinforcement ply comprising locating in a common plane a plurality of reinforcing cords in parallel spaced apart relation; locating alongside only every third to sixth reinforcing cord a gas absorbing cord with the gas absorbing cord being in parallel spaced relation to and lying in the same general plane as that of the reinforcing cords on opposite sides thereof and with said gas absorbing cord being of a diameter no greater than about one-third the diameter of one of said reinforcing cords and having a break strength of no greater than about 10 percent of one of said reinforcing cords and consisting of a multiplicity of staple filaments of one or more materials selected from the group consisting of nylon, rayon, polyester or glass; and passing the array of reinforcing cords and gas absorbing cords through a calender to embed and completely surround each of said reinforcing and gas absorbing cords in rubber or rubber-like material to form said reinforcement ply.

9. A method as described in claim 8 further comprising forming said reinforcement cords from continuous filaments of a thermoplastic material.

10. A method as described in claims 8 or 9 further comprising forming each gas absorbing cord from staple fibers of a length of between one-half to two inches and so as to have a break strength of between one and one-half pounds.

* * * * *